(12) United States Patent
Jin et al.

(10) Patent No.: US 7,974,195 B2
(45) Date of Patent: Jul. 5, 2011

(54) METHOD AND APPARATUS FOR NETWORK CONGESTION CONTROL

(75) Inventors: Cheng Jin, Pasadena, CA (US); Steven H. Low, La Canada, CA (US); Xiaoliang Wei, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 931 days.

(21) Appl. No.: 10/868,564

(22) Filed: Jun. 14, 2004

(65) Prior Publication Data
US 2005/0018617 A1    Jan. 27, 2005

Related U.S. Application Data

(60) Provisional application No. 60/477,830, filed on Jun. 12, 2003, provisional application No. 60/479,251, filed on Jun. 16, 2003, provisional application No. 60/482,060, filed on Jun. 23, 2003.

(51) Int. Cl.
   *H04J 3/14* (2006.01)
(52) U.S. Cl. ........................................ 370/231; 370/237
(58) Field of Classification Search .................. 370/237, 370/238, 252, 255, 412, 230, 235; 709/235
See application file for complete search history.

(56) References Cited

U.S. PATENT DOCUMENTS

| | | | |
|---|---|---|---|
| 5,063,562 A | | 11/1991 | Barzilai et al. |
| 5,931,893 A | * | 8/1999 | Dent et al. .................... 708/422 |
| 6,115,357 A | * | 9/2000 | Packer et al. ................. 370/231 |
| 6,894,974 B1 | * | 5/2005 | Aweva et al. .............. 370/230.1 |
| 7,020,083 B2 | | 3/2006 | Garcia-Luna-Aceves et al. |
| 2002/0154602 A1 | * | 10/2002 | Garcia-Luna-Aceves et al. ............. 370/230 |
| 2003/0063564 A1 | * | 4/2003 | Ha et al. ....................... 370/230 |
| 2003/0202480 A1 | * | 10/2003 | Swami .......................... 370/252 |
| 2004/0062201 A1 | * | 4/2004 | Deshpande .................. 370/235 |
| 2004/0064577 A1 | * | 4/2004 | Dahlin et al. ................ 709/235 |

(Continued)

OTHER PUBLICATIONS

Improving TCP Congestion Control over Internets with Heterogeneous Transmission Media, Christina Parsa and J.J. Garcia-Luna-Aceves, Computer Engineering Department, Baskin School of Engineering, University of California, Santa Cruz, California 95064, Jan. 25, 2000.*

(Continued)

*Primary Examiner* — Seema S Rao
*Assistant Examiner* — Leon Andrews
(74) *Attorney, Agent, or Firm* — Morgan, Lewis & Bockius LLP

(57) ABSTRACT

The present invention is a delay based model and in fact uses queuing delay as a congestion measure, providing advantages over prior art loss based systems. One advantage is that queuing delay can be more accurately estimated than loss probability. This is because packet losses in networks with large bandwidth-delay product are rare events under TCP Reno and its variants (probability on the order $10^{-7}$ or smaller), and because loss samples provide coarser information than queuing delay samples. Indeed, measurements of delay are noisy, just as those of loss probability. Thus, another advantage of the present invention is that each measurement of queuing delay provides multi-bit information while each measurement of packet loss (whether a packet is lost) provides only one bit of information for the filtering of noise. This makes it easier for an equation-based implementation to stabilize a network into a steady state with a target fairness and high utilization. In addition, the dynamics of queuing delay provides scaling with respect to network capacity. This helps maintain stability as a network scales up in capacity.

9 Claims, 9 Drawing Sheets

U.S. PATENT DOCUMENTS

| | | | |
|---|---|---|---|
| 2004/0072553 A1* | 4/2004 | Wang et al. | 455/334 |
| 2005/0021821 A1 | 1/2005 | Turnbull et al. | |
| 2005/0259577 A1 | 11/2005 | Sin | |
| 2005/0286416 A1 | 12/2005 | Shimonishi et al. | |
| 2006/0050640 A1 | 3/2006 | Jin et al. | |
| 2007/0121506 A1 | 5/2007 | Wydrowski et al. | |

OTHER PUBLICATIONS

Improving Internet Congestion Control and Queue Management Algorithms by Wu-chang Feng, Computer Science and Engineering, University of Michigan, 1999.*

Wu-Chang Feng, Improving Internet congestion control and queue management algorithms. Computer Science and Engineering, University of Michigan, 1999.*

S.Floyd et al., Modifying TCP's Congestion Control for High Speeds, May 5, 2002, http://citeseer.ist.psu.edu/cache/papers/cs/28676/http:zSzzSzwww.icirorgzSzfloydzSzpaperszSz.

M.Handley, et al., TCP Friendly Rate Control (TFRC): Protocol Specification, University of Manheim, Jan. 2003.

S.Floyd et al., Equation-based congestion control for unicast applications, Proc.ACM SIGCOMM'00, May 2000, http://www.icir.org/tfrc/tcp-friedly.pdf.

S.Floyd et al, A comparison of equation-based and AIMD congestion control, May 12, 2000, http://www.icir.org/tfrc/aimd.pdf.

L. Brakmo et al., TCP Vegas: end-to-end congestion avoidance on a global Internet, IEEE Journal on Selected Areas in Communications, 13(8):1465-80, Oct. 1995.

L. Brakmo et al., TCP Vegas: New Techniques For Congestion Detection and Avoidance, Feb. 16, 1994, http://www.icir.org/tfrc/aimd.pdf, Univ. of Arizona.

M.Gerla et al., TCP Westwood: Congestion Window Control Using Bandwidth Estimation, http://www.cs.ucla.edu/NRL/hpi/tcpw/tcpw_papers/TCPWGlobecomBasicPaperFinalDraft.pdf, 2001.

C.Casetti et al, TCP Westwood: End-to-end congestion control for wired/wireless networks, Wireless Networks Journal, 8:467-479, 2002.

T.Kelly, Scalable TCP: Improving performance in highspeed wide area networks, Computer Communication Review, 32(2), Apr. 2003; http://www-lce.eng.cam.ac.uk/~ctk21/scalable/.

G.Vinnicombe, On the stability of networks operating TCP-like congestion control, Proc. of IFAC World Congress, 2002, http://www-control.eng.cam.ac.uk/gv/internet/ifac.pdf.

F.Paganini et al, Congestion Control for High Performance, Stability and Fairness in General Networks, Apr. 4, 2003, http://www.ee.ucla.edu/~paganini/PDF/Papers/fast-jour.pdf.

C.Jin, D.X. Wei, and S.H. Low, TCP Fast: motivation, architecture, algorithms, performance. Proceedings of IEEE Infocom, Mar. 2004, http://netlab.caltech.edu.

F.Paganini et al., Scalable laws for stable network congestion control, Proc. Conference on Decision and Control, Dec. 2001,http://www.ee.ucla.edu/~paganini.

R.Jain, A delay-based approach for congestion avoidance in interconnected heterogeneous computer networks, ACM Computer Communication Review}, 19(5):56-71, Oct. 1989.

Z.Wang, J.Crowcroft, Eliminating periodic packet losses in the 4.3-Tahoe BSD TCP congestion control algorithm, ACM Computer Communications Review, Apr. 1992.

E. Weigle et al., A Case for TCP Vegas in High-Performance Computational Grids, 10th IEEE Int'l Symposium on High Performance Distributed Computing, Aug. 7-9, 2001, HPDC 2001.

R. Wang et al., Using Adaptive Rate Estimation To Provide Enhanced And Robust Transport Over Heterogeneous Networks, 10th IEEE Int'l Conf on Network Protocols, 2002, pp. 206-215.

S.Jin, L.Guo, I.Matta, A.Bestavros, A spectrum of TCP-friendly window-based congestion control algorithms, IEEE/ACM Transactions on Networking, 11(3), Jun. 2003.

D.Katabi, M.Handley, C.Rohrs, Congestion control for high-bandwidth delay product networks, Proc. ACM Sigcomm, Aug. 2002, http://www.ana.lcs.mit.edu/dina/XCP/.

R.Shorten et al., Analysis and design of congestion control in synchronised communication networks,Jun. 20, 2003, http://www.hamilton.ie/net/synchronised.pdf.

A.Kuzmanovic, E.Knightly, TCP-LP: A distributed Algorithm for Low Priority Data Transfer, Proc. IEEE Infocom, 2003, http://networks.rice.edu/papers/KuzKni03.pdf.

A.Aggarwal, S.Savage, and T.Anderson, Understanding the performance of TCP pacing, Proceedings on INFOCOM 2003, pp. 1157-1165, Mar. 2000.

Rene L. Cruz, A Calculus for Network Delay, Part I: Network Elements in Isolation, IEEE Transactions on Information Theory, vol. 37, No. 1, Jan. 1991, pp. 1-18.

Jacobson & Karels, Congestion Avoidance and Control, Sigcomm 1988, Nov. 1988, pp. 1-25.

Sanjay Hedge et al., Fast TCP in High Speed Networks: An Experimental Study, Proceeding of Gridnets, Oct. 29, 2004, San Jose CA, pp. 1-9.

Floyd & Jacobson, Random Early Detection Gateways for Congestion Avoidance, IEEE/ACM Transactions on Networking, Aug. 1993, pp. 1-22.

Wei & Low, A Burstiness Control for FastTCP, Caltech Whitepaper, www.cs.caltech.edu/~weixl/research/icnp.pdf, Jun. 9, 2004, pp. 1-24.

Choe & Low, Stabilized Vegas, Caltech Whitepaper, http://netlab.caltech.edu/FAST/papers/svegas_allerton02.pdf, Oct. 2002, pp. 1-19.

PCT US05/29329, International Search Report, pp. 1-7, which corresponds to copending U.S. Appl. No. 11/206,445.

* cited by examiner (a) Reno, HSTCP, and STCP (b) FAST (a) Binary singal: oscillatory (b) Multi-bit signal: stabilize Figure 5: From flow-level design to implementation.

METHOD AND APPARATUS FOR NETWORK CONGESTION CONTROL

CROSS-REFERENCE TO RELATED APPLICATIONS

The present application claims the benefit of priority from pending U.S. Provisional Application No. 60/477,830 filed Jun. 12, 2003, U.S. Provisional Application No. 60/479,251 filed Jun. 16, 2003, and U.S. Provisional Application Ser. No. 60/482,060 filed Jun. 23, 2003, which are herein incorporated by reference in their entirety.

GOVERNMENT LICENSE RIGHTS

The U.S. Government has certain rights in the present invention pursuant to Grant Nos. ANI-0113425 and ANI-0230967 awarded by the National Science Foundation.

BACKGROUND OF THE INVENTION

1. Field of the Invention

The present invention relates to the field of networks and to methods and apparatus for congestion control.

Portions of the disclosure of this patent document contain material that are subject to copyright protection. The copyright owner has no objection to the facsimile reproduction by anyone of the patent document or the patent disclosure as it appears in the Patent and Trademark Office file or records, but otherwise reserves all rights whatsoever.

2. Background Art

Computer networks allow communication between one or more computers. Networks include local area networks (LANs), wide area networks (WANs), the Internet, wireless networks, mixed device networks, and others. One limitation to the efficient use of networks is network congestion, when the number of message sources and destinations, and the amount of message traffic, is greater than the network can handle efficiently. In the prior art, such congestion problems are handled by implementing congestion control.

Congestion control is a distributed algorithm to share network resources among competing users. It is used in situations where the availability of resources and the set of competing users vary over time unpredictably, yet efficient sharing is desired. These constraints, unpredictable supply and demand and efficient operation, have been solved in the prior art by using feedback control. Feedback control, also referred to as "closed loop" control, involves the use of some metric to determine dynamic and typically real-time adjustment of a system to provide optimum results. Such systems are distinguished from so called "open loop" control systems where there is no feedback (for example, cooking a turkey without using a meat thermometer is open loop and using a meat thermometer is a closed loop feedback system).

In this prior art approach, traffic sources dynamically adapt their rates in response to congestion in their paths. An example of a network that uses feedback control as a congestion control is the Internet (using Transmission Control Protocol (TCP) in source and destination computers involved in data transfers). Note that although we discuss the Internet, the present application applies to other networks as well.

The congestion control algorithm in the current TCP, also known as "Reno", was developed in 1988 and has gone through several changes since. Current research predicts that as bandwidth-delay product continues to grow, TCP Reno will eventually become a performance bottleneck. In other words, the very control system used to manage congestion will lead to unsolvable congestion even as the network (Internet) continues to offer higher bandwidth and performance. Initially this may seem counter-intuitive. How can a system perform worse when it has greater resources with which to work? The following four difficulties contribute to the poor performance of TCP Reno in networks with large bandwidth-delay products.

1. At the packet level, linear increase by one packet per Round-Trip Time (RTT) is too slow, and multiplicative decrease per loss event is too drastic. Current schemes use this "speed up slowly/slow down quickly" approach to packet traffic control and it is not effective in high bandwidth systems.

2. At the flow level, maintaining large average congestion windows requires an extremely small equilibrium loss probability, and maintaining such a small loss probability is not practical in prior art systems.

3. At the packet level, oscillation is unavoidable because TCP uses a binary congestion signal (packet loss).

4. At the flow level, the dynamics are unstable, leading to severe oscillations that can only be reduced by the accurate estimation of packet loss probability and a stable design of the flow dynamics. Current systems do not allow for accurate enough estimation of packet loss.

Flow Level and Packet Level

A congestion control algorithm can be designed at two levels. The flow-level (macroscopic) design aims to achieve high utilization, low queuing delay and loss, fairness, and stability. The packet-level design implements these flow level goals within the constraints imposed by end-to-end control. Historically for TCP Reno, packet-level implementation was introduced first. The resulting flow-level properties, such as fairness, stability, and the relationship between equilibrium window and loss probability, were then understood as an afterthought. In contrast, other prior art packet-level designs such as HSTCP and STCP are guided by flow-level goals.

Packet and Flow Level Modeling

The congestion avoidance algorithm of TCP Reno and its variants use a window adjustment technique (from the AIMD algorithm) as follows:

$$Ack: w \leftarrow w + \frac{1}{w}$$

$$Loss: w \leftarrow w - \frac{1}{2}w$$

Although a packet level model, this induces certain flow level properties such as throughput, fairness and stability and can be understood by a flow level model of the AIMD algorithm. The window $w_i(t)$ of source i increases by one packet per RTT and decreases per unit time by $$x_i(t)q_i(t) \cdot \frac{1}{2} \cdot \frac{4}{3} w_i(t) \text{ packets}$$

where $$x_i(t) := w_i(t)/T_i(t) \text{ pkts/sec}$$

$T_i(t)$ is the round-trip time and $q_i(t)$ is the delayed end-to end loss probability, in period $t^2$. Here, $4w_i(t)/3$ is the peak window size that gives the average window of $w_i(t)$. Hence, a flow level model of AIMD is:

$$\dot{w}_i(t) = \frac{1}{T_i(t)} - \frac{2}{3}x_i(t)q_i(t)w_i(t) \quad (1)$$

Setting $\dot{w}_i(t)=0$ in (1) yields 1 over the square root of q formula for TCP Reno which relates loss probability to window size in equilibrium:

$$q_i^* = \frac{3}{2w_i^{*2}} \quad (2)$$

From (1), $$q_i^* w_i^* = \frac{3}{2w_i^*}$$

It can be seen that the number of packet losses per round trip time decreases in proportion of the equilibrium window size. Defining $$\kappa_i(w_i, T_i) = \frac{1}{T_i} \text{ and } u_i(w_i, T_i) = \frac{1.5}{w_i^2}$$

and noting that $w_i = x_i T_i$, (1) can be expressed as:

$$\dot{w}_i(t) = \kappa(t)\left(1 - \frac{q_i(t)}{u_i(t)}\right) \quad (3)$$

where we have used the shorthand $k_i(t) = k_i(w_i(t); T_i(t))$ and $u_i(t) = u_i(w_i(t); T_i(t))$. It can be shown that different variants of TCP all have the same dynamic structure (3) at the flow level. They differ in the choices of the gain function $k_i$ and marginal utility function $u_i$, and whether the congestion measure $q_i$ is loss probability or queuing delay.

Equilibrium Problem

The equilibrium problem at the flow level is expressed in (2): the end-to-end loss probability must be small to sustain a large window size, making the equilibrium difficult to maintain in practice, as bandwidth-delay product increases.

Even though equilibrium is a flow-level notion, this problem manifests itself at the packet level, where a source increments its window too slowly and decrements it too drastically. Prior art approaches can be compared to driving in a car and only being able to see 10 feet ahead of your car. The car accelerates slowly until the driver sees another car and then rapidly brakes to avoid collision. This works well in a parking lot where speeds are low and space is limited. But the same system on a freeway does not work because the greater speeds that can be obtained are negated by the limited look ahead of the driver. The result is continuous acceleration and braking, eliminating all advantages of the greater room and speed. The same thing applies when the current systems are applied to high bandwidth networks.

For example, when the peak window is 80,000-packets (corresponding to an "average" window of 60,000 packets, necessary to sustain 7.2 Gbps using 1,500-byte packets with a RTT of 100 ms) it takes 40,000 RTTs, or almost 70 minutes, to recover from a single packet loss.

This disadvantage is illustrated in FIG. 1A, where the size of window increment per RTT and decrement per loss, 1 and $0.5w_i$, respectively, are plotted as functions of $0.5w_i$. The increment function for Reno (and for HSTCP) is almost indistinguishable from the x-axis. Moreover, the gap between the increment and decrement functions grows rapidly as $w_i$ increases. Since the average increment and decrement must be equal in equilibrium, the required loss probability can be exceedingly small at large $w_i$. This picture is thus a visualization of (2).

The causes of the oscillatory behavior of TCP Reno lie in its design at both the packet and flow levels. At the packet level, the choice of binary congestion signal necessarily leads to oscillation, and the parameter setting in Reno worsens the situation as bandwidth-delay product increases. At the flow level, the system dynamics given by (1) is unstable at large bandwidth-delay products. These problems must be addressed by different means.

FIG. 2A illustrates the operating points chosen by various TCP congestion control algorithms, using the single-link single-flow scenario. It shows queuing delay as a function of window size. Queuing delay starts to build up after point C where window equals bandwidth-propagation-delay product, until point R where the queue overflows. Since Reno oscillates around point R, the peak window size goes beyond point R. The minimum window in steady state is half of the peak window. This is the basis for the rule of thumb that bottleneck buffer should be at least one bandwidth-delay product. The minimum window will then be above point C, and the buffer will not empty in steady state operation, yielding full utilization.

In the loss-based approach, full utilization, even if achievable, comes at the cost of severe oscillations and potentially large queuing delay. The DUAL scheme proposes to oscillate around point D, the midpoint between C and R when the buffer is half-full. DUAL increases the congestion window linearly by one packet per RTT, as long as queuing delay is less than half of the maximum value, and decreases multiplicatively by a factor of ⅛, when queuing delay exceeds half of the maximum value. The scheme CARD (Congestion Avoidance using Round-trip Delay) proposes to oscillate around point C through AIMD with the same parameter (1; 1=8) as DUAL, based on the ratio of round-trip delay and delay gradient, to maximize power. In all these schemes, the congestion signal is binary, and hence the congestion window must oscillate.

The congestion window can be stabilized if multi-bit feedback is used. The congestion window is adjusted in an equation based control scheme based on the estimated loss probability in an attempt to stabilize around a target value given by (2). Its operating point is T in FIG. 2B, near the overflowing point. This approach eliminates the oscillation due to packet-level AIMD, but two difficulties remain at the flow level.

First, equation-based control requires the explicit estimation of end-to-end loss probability. This is difficult when the loss probability is small. Second, even if loss probability can be perfectly estimated, Reno's flow dynamics, described by equation (1) leads to a feedback system that becomes unstable as feedback delay increases, and again, strikingly, as network capacity increases. The instability at the flow level can lead to severe oscillations that can be reduced only by stabilizing the flow level dynamics.

Loss Based Approach

Two loss based approaches to these problems are HSTCP and STCP, but neither provides full and complete solutions to prior art disadvantages.

HSTCP

The design of HSTCP proceeded almost in the opposite direction to that of TCP Reno. The system equilibrium at the flow-level is first designed, and then, the parameters of the packet-level implementation are determined to implement the flow-level equilibrium. The first design choice decides the relation between window w*i and end-to-end loss probability q*i in equilibrium for each source i:

$$q_i^* = \frac{0.0789}{w_i^{*1.1976}} \quad (4)$$

The second design choice determines how to achieve the equilibrium defined by (4) through packet-level implementation. The (congestion avoidance) algorithm is AIMD, as in TCP Reno, but with parameters $a(w_i)$ and $b(w_i)$ that vary with source i's current window $w_i$. The pseudo code for window adjustment is:

Ack: $w \leftarrow w + \frac{a(w)}{w}$

Loss: $w \leftarrow w - b(w)w$

The design of $a(w_i)$ and $b(w_i)$ functions is as follows. From a discussion of the single-flow behavior, this algorithm yields an equilibrium where the following holds $$\frac{a(w_i^*)}{b(w_i^*)} \cdot \left(1 - \frac{b(w_i^*)}{2}\right) = q_i^* w_i^{*2} \quad (5)$$

$$= 0.0789 w_i^{*0.8024}$$

where the last equality follows from (4). This motivates the design that, when loss probability $q_i$ and the window $w_i$ are not in equilibrium, one chooses $a(w_i)$ and $b(w_i)$ to force the relation (5) "instantaneously":

$$\frac{a(w_i)}{b(w_i)} \cdot \left(1 - \frac{b(w_i)}{2}\right) = 0.0789 w_i^{0.8024} \quad (6)$$

The relation (6) defines a family of $a(w_i)$ and $b(w_i)$ functions. Picking either one of $a(w_i)$ and $b(w_i)$ function uniquely determines the other function. The next design choice made is to pick a $b(w_i)$, hence also fixing $a(w_i)$. The choice of $b(w_i)$ is, for $w_i$ between 38 and 83,333 packets, $$b(w_i) = -k_1 \log_e w_i + k_2 \quad (7)$$

where $k_1$=j0:0520 and $k_2$=0:6892. This fixes $a(w_i)$ to be, from (6), $$a(w_i) = 0.1578 w_i^{0.8024} \frac{b(w_i)}{2 - b(w_i)}$$

where $b(w_i)$ is given by (7). For $w_i$ less than or equal to 38 packets, $a(w_i)$=1, $b(w_i)$=0:5, and HSTCP reduces to TCP Reno. For $w_i$ (from 38 to 83,000 packets), $b(w_i)$ varies between [0:1; 0:5]. The flow level model of HSTCP can be modeled using a similar argument to derive (1) for TCP Reno:

$$\dot{w}_i(t) = \frac{a(w_i(t))}{T_i(t)} - \frac{2b(w_i(t))}{2 - b(w_i(t))} x_i(t) q_i(t) w_i(t)$$

$$= \frac{2b(w_i(t))}{T_i(t)(2 - b(w_i(t)))} \cdot \left(\frac{a(w_i(t))}{b(w_i(t))}\left(1 - \frac{b(w_i(t))}{2}\right) - q_i(t) w_i^2(t)\right)$$

Using (6) to replace the first term in parentheses gives:

$$\dot{w}_i(t) = \frac{2b(w_i(t))}{T_i(t)(2 - b(w_i(t)))} \cdot (0.0789 w_i^{0.8024}(t) - q_i(t) w_i^2(t)) \quad (8)$$

In summary, the model of HSTCP is given by (4), (8) and (7).

Scalable TCP (STCP)

The (congestion avoidance) algorithm of STCP is MIMD:

Ack: w←w+a

Loss: w←w−bw for some constants 0<a; b<1. Note that in each round-trip time without packet loss, the window increases by a multiplicative factor of a. The recommended values in some implementations are a=0:01 and b=0:125.

As for HSTCP, the flow-level model of STCP is $$\dot{w}_i = \frac{aw_i(t)}{T_i} - \frac{2b}{2-b} x_i(t) q_i(t) w_i(t)$$

where $x_i(t):=w_i(t)=T_i$. In equilibrium, we have $$q_i^* w_i^* = \frac{a}{b}\left(1 - \frac{b}{2}\right) =: \rho \quad (9)$$

This implies that, on average, there are p loss events per round-trip time, independent of the equilibrium window size. We can rewrite (9) in the form of (3) with the gain and marginal utility functions:

$$\kappa_i(w_i, T_i) = \frac{aw_i}{T_i}$$

$$u_i(w_i, T_i) = \frac{\rho}{w_i}$$

The increment and decrement functions of HSTCP and STCP are shown plotted in FIG. 1A. Both upper bound those of Reno: they increase more aggressively and decrease less drastically, so that the gap between the increment and decrement functions is narrowed. At the flow level, this means that, in equilibrium, both HSTCP and STCP can tolerate larger loss probabilities than TCP Reno (compare (4) and (9) with (2)). This alleviates the some problems with TCP Reno. It does not, however, solve the dynamic problems at the packet and the flow levels.

SUMMARY OF THE INVENTION

The present invention provides a method and apparatus for network congestion control. The present invention is a delay based model and in fact uses queuing delay as a congestion measure, providing advantages over prior art loss based systems. One advantage is that queuing delay can be more accurately estimated than loss probability. This is because packet losses in networks with large bandwidth-delay product are rare events under TCP Reno and its variants (probability on the order $10^{-7}$ or smaller), and because loss samples provide coarser information than queuing delay samples. Indeed, measurements of delay are noisy, just as those of loss probability. Thus, another advantage of the present invention is that each measurement of queuing delay provides multi-bit information while each measurement of packet loss (whether a packet is lost) provides only one bit of information for the filtering of noise. This makes it easier for an equation-based implementation to stabilize a network into a steady state with a target fairness and high utilization. In addition, the dynamics of queuing delay provides scaling with respect to network capacity. This helps maintain stability as a network scales up in capacity.

BRIEF DESCRIPTION OF THE DRAWINGS

These and other features, aspects and advantages of the present invention will become better understood with regard to the following description, appended claims and accompanying drawings where:

DETAILED DESCRIPTION OF THE INVENTION

Figure 1A:
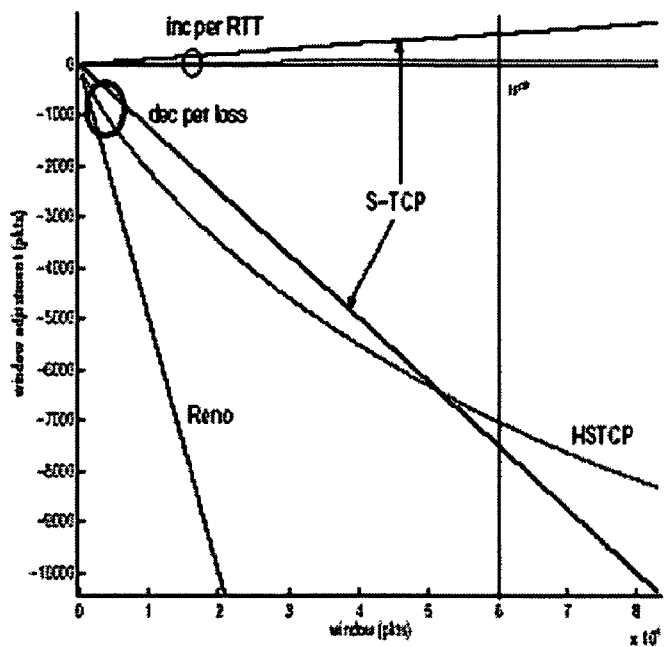
FIG. 1A illustrates window increment per RTT and window decrement per loss in certain prior art congestion control systems.

The embodiments of the present invention are a method and an apparatus for network congestion control. In the following description, numerous specific details are set forth to provide a more thorough description of embodiments of the invention. It will be apparent, however, to one skilled in the art, that the embodiments of the present invention may be practiced without these specific details. In other instances, well known features have not been described in detail so as not to obscure the invention.

The present invention is a delay based scheme that utilizes an equation-based packet-level implementation with an explicit estimation the of end-to-end congestion measure $q_i(t)$. This allows for the elimination of packet-level oscillations that are due to the binary nature of the congestion signal. The motivation for the present implementation is as follows.

As noted above, the congestion windows in Reno, HSTCP, and STCP evolve according to:

$$\dot{w}_i(t) = \kappa_i(t) \cdot \left(1 - \frac{q_i(t)}{u_i(t)}\right) \quad (10)$$

where $k_i(t):=k_i(w_i(t); T_i(t))$ and $u_i(t):=u_i(w_i(t); T_i(t))$. Embodiments of the present invention follow this model but differ in the choice of the gain function $k_i(w_i; T_i)$, the marginal utility function $u_i(w_i; T_i)$, and the end-to-end congestion measure $q_i$. Within this structure, at the flow level, there are thus certain design decisions as follows:

$k_i(w_i; T_i)$: the choice of the gain function $k_i$ determines the dynamic properties such as stability and responsiveness, but does not affect the equilibrium properties.

$u_i(w_i; T_i)$: the choice of the marginal utility function $u_i$ mainly determines equilibrium properties such as the equilibrium rate allocation and its fairness.

$q_i$: in the absence of explicit feedback, the choice of congestion measure $q_i$ is limited to loss probability or queuing delay. The dynamics of $q_i(t)$ is determined at links.

The design choices in Reno, HSTCP, STCP and the present invention are shown in Table 1. These choices produce equilibrium characterizations shown in Table 2.

TABLE 1

|  | $k_i(w_i, T_i)$ | $u_i(w_i, T_i)$ | $q_i$ |
| --- | --- | --- | --- |
| Reno | $1/T_i$ | $1.5/w_i^2$ | loss probability |
| HSTCP | $\dfrac{0.16b(w_i)w_i^{0.80}}{(2 - b(w_i))T_i}$ | $0.08/w_i^{1.20}$ | loss probability |
| STCP | $aw_i/T_i$ | $\rho/w_i$ | loss probability |
| FAST | $\gamma \alpha_i$ | $\alpha_i/x_i$ | queueing delay |

TABLE 2

| Reno | $x_i = \dfrac{1}{T_i} \cdot \dfrac{\alpha_i}{q_i^{0.50}}$ |
| --- | --- |
| HSTCP | $x_i = \dfrac{1}{T_i} \cdot \dfrac{\alpha_i}{q_i^{0.84}}$ |
| STCP | $x_i = \dfrac{1}{T_i} \cdot \dfrac{\alpha_i}{q_i}$ |
| FAST | $x_i = \dfrac{\alpha_i}{q_i}$ |

This common model (10) can be interpreted as follows: the goal at the flow level is to equalize marginal utility $u_i(t)$ with the end-to-end measure of congestion, $q_i(t)$. This interpretation suggests an equation-based packet-level implementation where both the direction and size of the window adjustment $w_i(t)$ are based on the difference between the ratio $q_i(t)=u_i(t)$ and the target of 1. Unlike the approach taken by Reno, HSTCP, and STCP, this approach as used by embodiments of the invention eliminates packet-level oscillations due to the binary nature of the congestion signal. As noted above, however, it however requires the explicit estimation of the end-to-end congestion measure $q_i(t)$.

Without explicit feedback, $q_l(t)$ can only be loss probability, as used in TFRC, or queuing delay, as used in TCP Vegas and in an embodiment of the present invention. Queuing delay can be more accurately estimated than loss probability both because packet losses in networks with large bandwidth-delay products are rare events (probability on the order $10^{-7}$ or smaller), and because loss samples provide coarser information than queuing delay samples. Each measurement of packet loss (whether a packet is lost) provides one bit of information for the filtering of noise, whereas each measurement of queuing delay provides multi-bit information. This allows an equation-based implementation to stabilize a network into a steady state with a target fairness and high utilization.

At the flow level, the dynamics of the feedback system must be stable in the presence of delay, as the network capacity increases. Here, again, queuing delay has an advantage over loss probability as a congestion measure. This helps maintain stability as network capacity grows.

The delay-based approach, with proper flow and packet level designs, can address the four difficulties of Reno at large windows. First, by explicitly estimating how far the current state $q_i(t)=u_i(t)$ is from the equilibrium value of 1, the present invention can drive the system rapidly, yet in a fair and stable manner, toward the equilibrium. This is because the present invention is more intelligent (in the sense of information) than prior art systems. It is more "closed loop" than TCP Reno. Instead of being triggered to make an adjustment and then following a fixed path to recovery (i.e. slow increase, rapid decrease of prior art), the present invention is both triggered to make an adjustment and provided with information about the target adjustment.

Figure 1B:
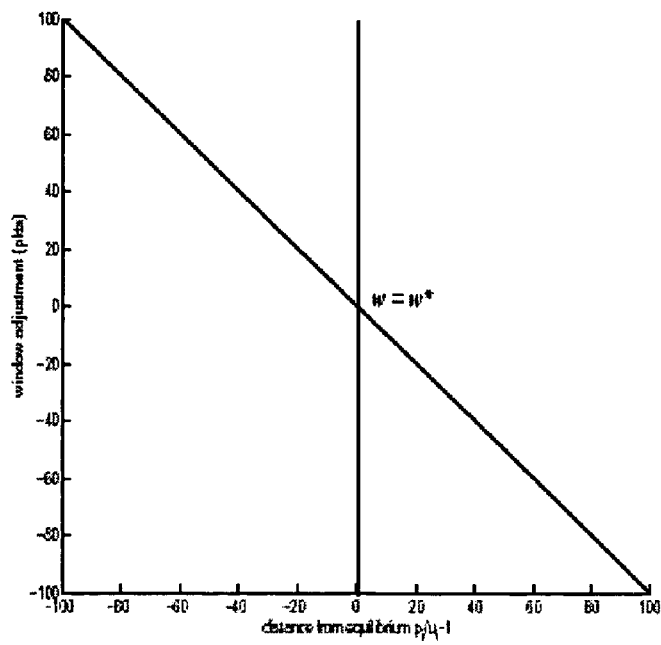
FIG. 1B illustrates window update as a function of distance from equilibrium in an embodiment of the present invention.

Thus, the window adjustment is small when the current state is close to equilibrium and large otherwise, independent of where the equilibrium is, as illustrated in FIG. 1B. This is in contrast to the approach taken by Reno, HSTCP, and STCP, where window adjustment depends on just the current window size and is independent of where the current state is with respect to the target (compare FIGS. 1A and 1B). The approach of the invention avoids the problem of slow increase and drastic decrease in Reno, as the network scales up.

Second, by choosing a multi-bit congestion measure, this approach eliminates the packet-level oscillation due to binary feedback, avoiding Reno's third problem.

Figure 2A:
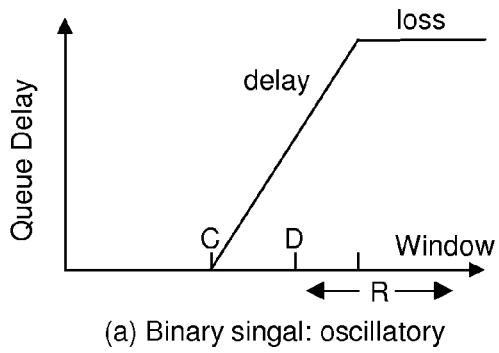
FIG. 2A illustrates operating points of certain prior art congestion control systems.
Figure 2B:
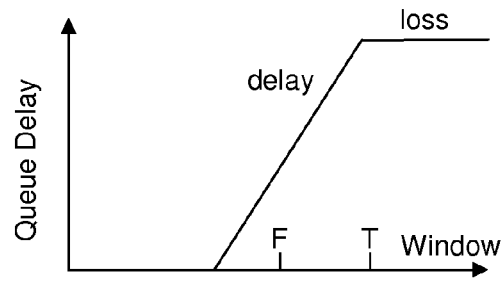
FIG. 2B illustrates a multi-bit feedback approach of the prior art and of the present invention.

Third, using queuing delay as the congestion measure $q_l(t)$ allows the network to stabilize in the region below the overflowing point, around point F in FIG. 2B, when the buffer size is sufficiently large. Stabilization at this operating point eliminates large queuing delay and unnecessary packet loss. It also makes room for buffering "mice" traffic. To avoid the second problem in Reno, where the required equilibrium congestion measure (loss probability for Reno, and queuing delay here) is too small to practically estimate, the algorithm adapts its parameter $\alpha_i$ with capacity to maintain small but sufficient queuing delay.

Finally, to avoid the fourth problem of Reno, the window control algorithm should be stable, in addition to being fair and efficient, at the flow level. The use of queuing delay as a congestion measure facilitates the design as queuing delay naturally scales with capacity.

The design of a TCP congestion control algorithm can be described at the flow level and the packet level. At the flow level, the goal is to design a class of function pairs, $u_i(w_i; T_i)$ and $(w_i; T_i)$, so that the feedback system described by (10), together with link dynamics in $q_l(t)$ and the interconnection, has an equilibrium that is fair and efficient, and that the equilibrium is stable, in the presence of feedback delay.

At the packet level, the design should deal with issues that are ignored by the flow-level model or modeling assumptions that are violated in practice, in order to achieve these flow level goals. These issues include burstiness control, loss recovery, and parameter estimation.

Architecture

Figure 3:
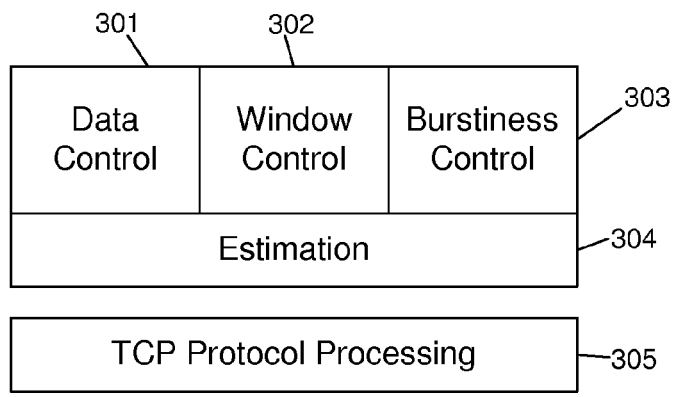
FIG. 3 is a block diagram of the architecture of the present invention.

A block diagram of the architecture of the congestion control mechanism of TCP of one embodiment of the present invention is illustrated in FIG. 3. In one embodiment, the components shown are functionally independent so that they can be designed separately and upgraded asynchronously. A data control unit 301, window control unit 302, and burstiness control unit 303 all communicate to an estimation block 304. This system in turn communicates with TCP protocol processing block 305. It should be noted that the present invention is not limited to TCP networks.

The data control component 301 determines which packets to transmit, window control 302 determines how many packets to transmit, and burstiness control 303 determines when to transmit these packets. These decisions are made based on information provided by the estimation component 304. Window control 302 regulates packet transmission at the RTT timescale, while burstiness control 303 works at a smaller timescale. The data control block provides loss control capability. When necessary, the data control block can lower the ACK frequency to reduce the processing load.

Figure 9:
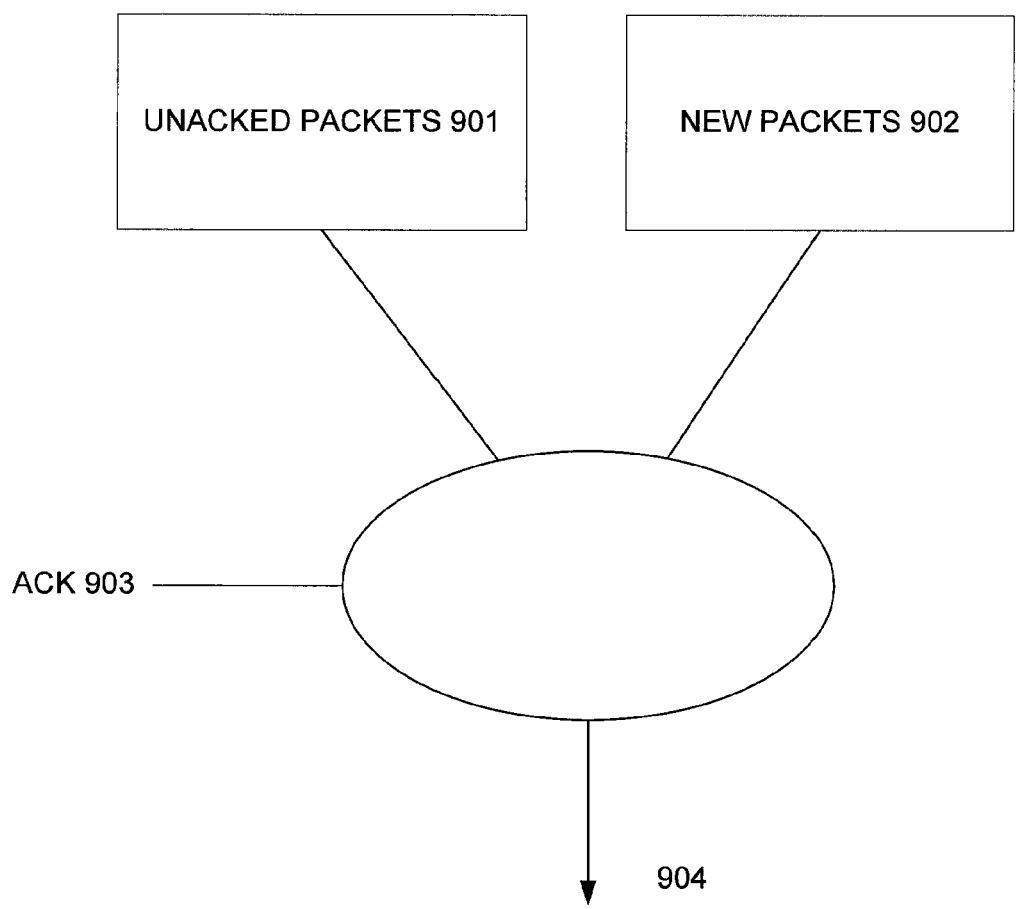
FIG. 9 is a block diagram of the data control block of FIG. 3.

The data control block is illustrated in FIG. 9. Unacked packets 901, new packets 902 and Ack signals 903 are provided to a scheduler 904 that determines which packet to transmit.

Figure 6:
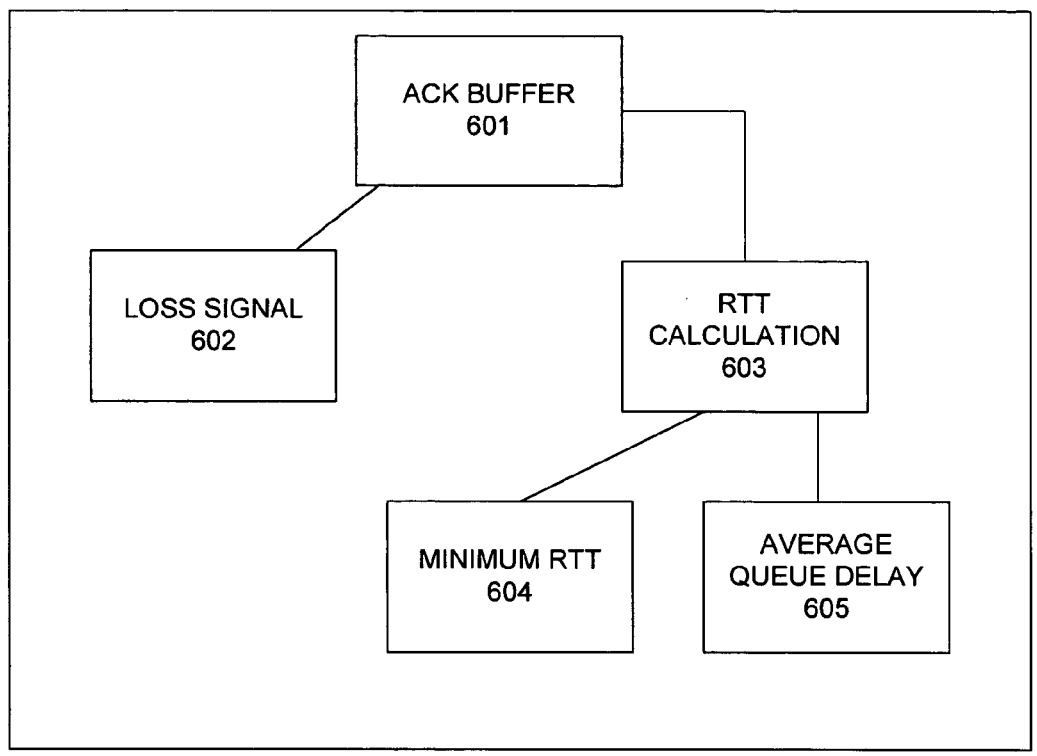
FIG. 6 is a block diagram of the estimation block of FIG. 3.

The estimation block 304 component provides estimations of various input parameters to the other three decision-making components. A block diagram of the architecture of the estimation block 304 is illustrated in FIG. 6. The estimation block 304 comprises an ack buffer 601 that receives acks from packets sent on the network. The estimation block 304 computes two pieces of feedback information for a sequence of data packets sent. When a positive acknowledgment is received at ack buffer 601, RTT calculation block 603 calculates the minimum RTT 604 for the corresponding sequence of data packet and updates the average queuing delay 605. When a negative acknowledgment (signaled by three duplicate acknowledgments or timeout) is received, it generates a loss indication at loss signal 602 for this data packet to the other components. The loss signal 602, minimum RTT 604, and average queue delay 603 are provided to the other components (data control block 301, window control block 302, and burstiness control block 303).

The queuing delay is smoothed by taking a moving average with the weight $\eta(t):=\min\{3/w_i(t), 1/4\}$ that depends on the window $w_i(t)$ at time t, as follows. The k-th RTT sample $T_i(k)$ updates the average RTT $\overline{T}_i(k)$ according to:

$$\overline{T}_i(k+1)=(1-\eta(t_k))\overline{T}_i(k)+\eta(t_k)T_i(k)$$

where $t_k$ is the time at which the k-th RTT sample is received. Taking $d_i(k)$ to be the minimum RTT observed so far, the average queuing delay is estimated as:

$$\hat{q}_i(k)=\overline{T}_i(k)-d_i(k)$$

The weight $\eta(t)$ is usually smaller than the weight (1/8) used in TCP Reno. The average RTT $\overline{T}_i(k)$ attempts to track the average over one congestion window. During each RTT, an entire window's worth of RTT samples are received if every packet is acknowledged. (Otherwise, if delayed ack is used, the number of queuing delay samples is reduced, so $\eta(t)$ should be adjusted accordingly).

It is observed that setting $d_i(k)$ to be the minimum RTT observed as an estimate of round-trip propagation delay can be problematic when a route changes or when there is a persistent queue. When the new route has a longer propagation delay, the increase in round-trip time measurement is interpreted as congestion. The source may then reduce its window when it should have increased it. When a source starts, its observed round trip time may include queuing delay due to packets in its path from existing sources.

Figure 7:
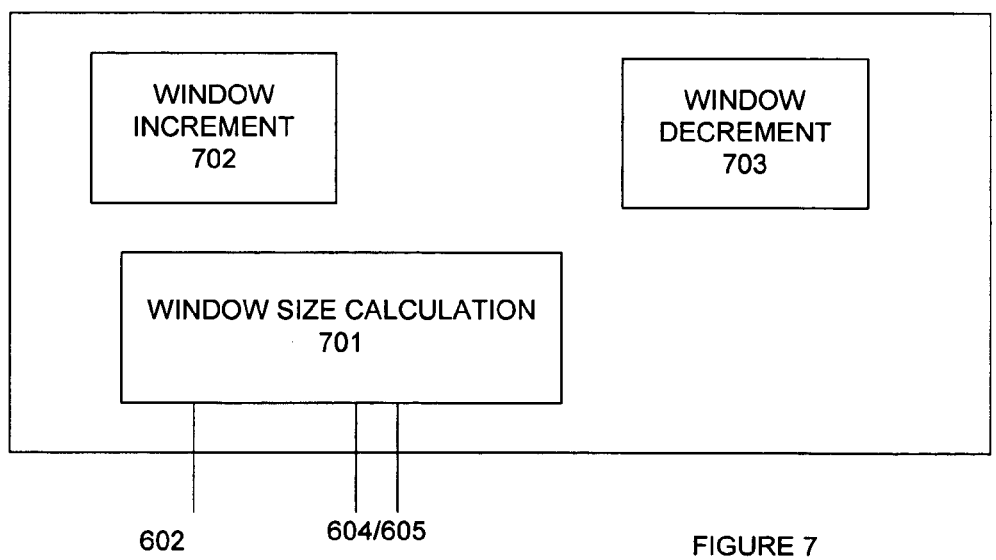
FIG. 7 is a block diagram of the window control block of FIG. 3.

The window control component 302 determines a congestion window based on congestion information—queuing delay and packet loss, provided by the estimation component 304. A block diagram of window control component 302 is illustrated in FIG. 7. The single bit loss signal 602 and minimum RTT 604/Average queue delay 605 signals are provided as inputs to window size calculation block 701. In one embodiment of the invention, the same algorithm is used for congestion window computation independent of the state of the sender. For example, in TCP Reno (without rate halving), the congestion window is increased (window increment block 702) by one packet every RTT when there is no loss, and increased by one for each duplicate ack during loss recovery. In one embodiment of the present invention, the same algorithm is used for window computation regardless of the sender state.

The congestion control mechanism reacts to both queuing delay and packet loss. Under typical network conditions, the present invention periodically updates the congestion window based on the average RTT and average queuing delay provided by the estimation component, according to:

$$w \leftarrow \min\left\{2w, (1-\gamma)w + \gamma\left(\frac{baseRTT}{RTT}w + \alpha(w, qdelay)\right)\right\} \quad (11)$$

where $\gamma$ is an element of $(0; 1]$, baseRTT is the minimum RTT observed so far, and qdelay is the end-to-end (average) queuing delay. In one embodiment, the congestion window changes over two RTTs (updated in one RTT and frozen in the next). The update is spread out over the first RTT in a way such that the congestion window is no more than doubled in each RTT.

In one embodiment, the function $\alpha(w, qdelay)$ is chosen to be a constant at all times. This produces linear convergence when the qdelay is zero. Alternatively, we can use a constant $\alpha$ only when qdelay is nonzero and an a proportional to window, $\alpha$ (w, qdelay)=$\alpha$w, when qdelay is zero. In this case, when qdelay is zero, the invention performs multiplicative increase and grows exponentially at rate a to a neighborhood of qdelay>0. Then $\alpha$ (w, qdelay) switches to a constant $\alpha$ and, the window converges exponentially to the equilibrium at a different rate that depends on qdelay. The constant $\alpha$ is the number of packets each flow attempts to maintain in the network buffer(s) at equilibrium.

In one embodiment of the invention, when a packet loss is detected, the system halves its window (window decrement block 703) and enters loss recovery. The goal is to back off packet transmission quickly when severe congestion occurs, in order to bring the system back to a regime where reliable RTT measurements are again available for window adjustment (11) to work effectively. A source does not react to delay until it exits loss recovery.

Figure 8:
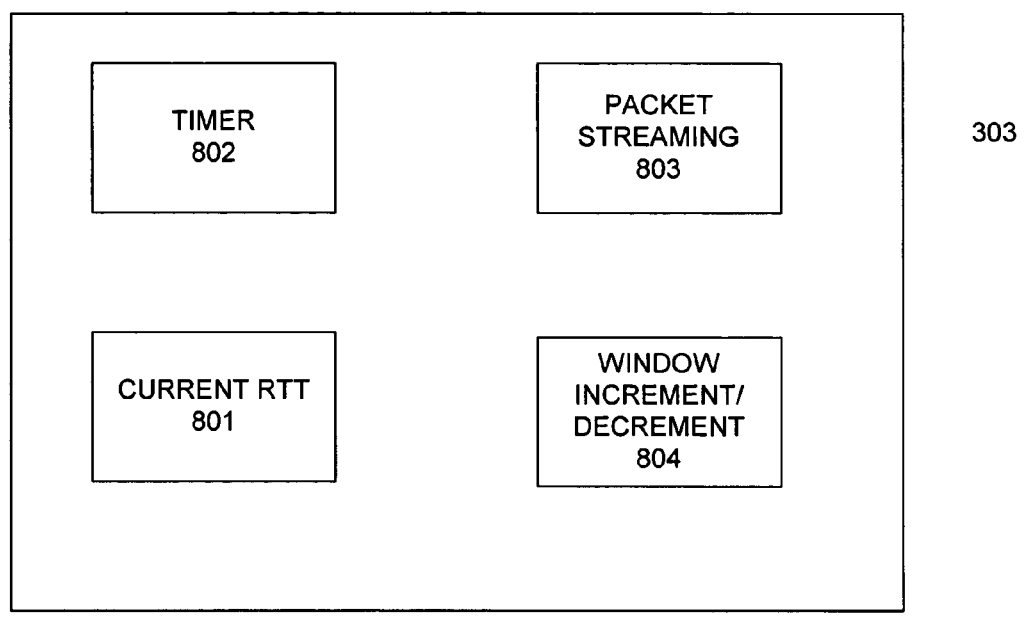
FIG. 8 is a block diagram of the burstiness control block of FIG. 3.

The burstiness control component 303 is illustrated in FIG. 8. The burstiness control block smooths out transmission of packets in a fluid-like manner to track the available bandwidth. It is useful in, for example, networks with large bandwidth-delay products, where large bursts of packets may create long queues and even massive losses in either networks or end-hosts.

Current burstiness control schemes such as TCP Reno use self-clocking to regulate burstiness by transmitting a new packet only when an old packet is acknowledged. This works when the receiver acknowledges every data packet. However, when the congestion window is large, self-clocking is not sufficient to control burstiness under three scenarios. First, lost or delayed acks can often lead to a single ack acknowledging a large number of outstanding packets. In this case, self-clocking will allow the transmission of a large burst of packets. Second, acks may arrive in a burst at a sender due to queuing of acks in the reverse path (ack compression) of the connection, again triggering a large burst of outgoing packets. Third, in networks with large bandwidth-delay product, congestion window can be increased by a large amount during transient, e.g., in slow-start. This breaks packet conservation and self-clocking, and allows a large burst of packets to be sent.

Pacing is a common way to solve the burstiness problem at sender. A straightforward implementation of pacing would have the TCP sender schedule successive packet transmissions at a constant time interval, obtained by dividing the congestion window by the current RTT. In practice, this would require a timer with a high resolution. For example, in a network with 1 Gbps bottleneck link and 100 ms minimum RTT, the equilibrium window is roughly 8,000 packets. This translates into a scheduling interval of 12.5 µs. Considering that the typical kernel task scheduler runs every 10 ms, the overhead of scheduling packet transmissions at 12.5 µs apart could degrade overall OS performance. The overhead of scheduling can be reduced by scheduling small bursts of packets instead of individual packets.

However, at large congestion window, pacing alone cannot solve the burstiness problem. The present invention uses two burstiness control mechanisms as shown in FIG. 8, a packet streaming block 803 to supplement self-clocking in streaming out individual packets and the a window increment block 804 to increase window size smoothly in smaller bursts. The burstiness control block 303 also includes a timer 802 of suitable resolution and a current RTT buffer 801. Burstiness reduction block 303 decides how many packets to send, when an ack advances congestion window by a large amount, and attempts to limit the burst size on a smaller timescale than one RTT. Window pacing determines how to increase the congestion window over the idle time of a connection to the target determined by the window control component. Thus, the invention is able to reduce or even eliminate burstiness with a reasonable amount of scheduling overhead.

Burstiness Reduction

Figure 10:
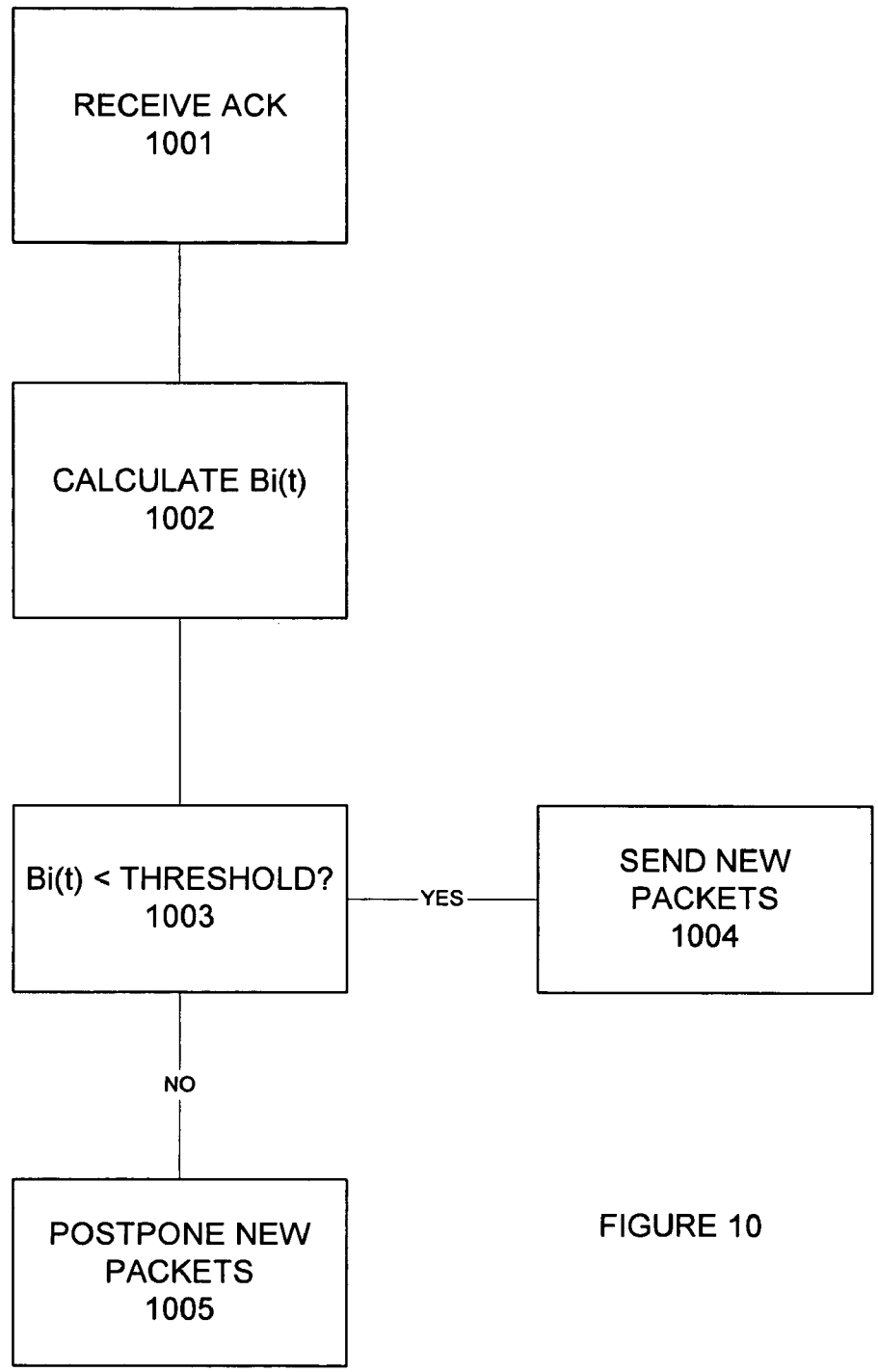
FIG. 10 is a flow diagram illustrating one embodiment of burstiness control.

The congestion window regulates packet transmission on the RTT timescale. The ratio of window to RTT may be thought of as the target throughput in each RTT. At large window size, e.g., a window of 14,000 packets over a RTT of 180 ms, the instantaneous transmission rate can exceed the target throughput when acks are compressed, delayed, or lost. The packet streaming block 803 of the burstiness reduction mechanism 303 controls the transmission rate within each round-trip time by limiting bursts, as follows (see FIG. 10). Define the instantaneous burstiness, $B_l$, right before the sending time of packet l as the extra backlog introduced during the RTT before packet l is sent.

$$B_l = \max_{a \le k \le l} \left\{ l - k - \sum_{j=k+1}^{l} \frac{w_j}{D_j}(t_j - t_{j-1}) \right\} \quad (12)$$

Here $t_j$ is the time when packet j is sent, $w_j$ and $D_j$ are the window size and RTT at time $t_j$ respectively, $B_l$ measures the "extra" backlog that is built up in the last RTT in addition to the backlog due to window control. A large $B_l$ indicates a sudden burst of input traffic, potentially leading large queuing delay, guffer overflow, massive losses and drastic reduction of window. The present invention proposes to send packets when burstiness measured by $B_l$ is small.

At time $t_l$ when $B_l$ is computed, l and $s_l$ are known at the sender. To calculate burstiness $B_l$ according to (12), the invention stores $w_k$, $D_k$, and $t_k$ with packets k that are sent out but not acknowledged, for $s_l \le k \le l$. The computational cost is $$O\left(\frac{1}{2}(l-s_l)^2\right) = O\left(\frac{w_l^2}{2}\right)$$

for each packet, where $w_l$ is the window size when packet l is sent. This can be significant overhead when window size is large. To reduce the cost, techniques are described below to compute burtiness $B_l$ recursively.

Recursive Computation of $B_l$

Consider the sequence:

$$B(s, l) = \max_{s \le k \le l} \left\{ l - k - \sum_{j=k+1}^{l} \frac{w_j}{D_j}(t_j - t_{j-1}) \right\} \quad (13)$$

Hence $B_l = B(s_l, l)$ and $B(l,l) = 0$ for all l. Moreover, $$B(s, l+1) = \max_{a \le k \le l+1} \left( (l+1) - k - \sum_{j=k+1}^{l+1} \frac{w_j}{D_j}(t_j - t_{j-1}) \right) \quad (14)$$

$$= \max\left\{ \max_{a \le k \le l}\left( l - k - \sum_{j=k+1}^{l} \frac{w_j}{D_j}(t_j - t_{j-1}) + 1 - \frac{w_{l+1}}{D_{l+1}}(t_{l+1} - t_l) \right), 0() \right\}$$

Since the last two terms in "( )" are independent of the maximization variable k, the maximization of the first three terms yields B(s,l). Hence for each s, B(s,l) can be computed recursively from B(s,l−1) according to:

$$B(s, l) = \left[ B(s, l-1) + 1 - \frac{w_l}{D_l}(t_l - t_{l-1}) \right]^+ \quad (15)$$

where $[z]^+ = \max\{z, 0\}$. At time $t_l$, we can use (15) to calculate recursively the burstiness $B_l = B(s_l, 1)$ starting from the initial condition $B(s_l, sl) = 0$. The running cost is $O(w_l)$.

If $s_l = s_{l-1}$, then $B_l = B(s_l, l) = B(s_{l-1}, l)$. Hence $B_l$ can be obtained from $B(s_{l-1}, l-1)$ directly (as opposed to recursively) from 15, with running cost of $O(1)$. Indeed, this one-step computation is possible under a more general condition than $s_l = s_{l-1}$, but that requires keeping track of how a maximizer in the definition of burstiness (12) evolves.

Let k*(s,l) be a maximizer in (13), i.e., given s is less than l $$k^*(s, l) = \operatorname*{argmax}_{a \le k \le l} \left\{ l - k - \sum_{j=k+1}^{l} \frac{w_j}{D_j}(t_j - t_{j-1}) \right\}$$

then k*(s,s)=s for all s, and $k_l^* = k^*(s_l, l)$ is a maximizer in the burstiness definition (12). From the recursion (15) on B(s,l), we obtain a recursion on a maximizer k*(s,l) as:

$$k^*(s, l) = \begin{cases} l & \text{if } B(s, l) = 0 \\ k^*(s, l-1) & \text{otherwise} \end{cases} \quad (16)$$

The following theorem provides a sufficient condition under which burstiness $B_l$ and a maximizer $k_l^*$ in its definition (12) can be computed from their previous values with O(1) cost independent of window size. This condition is implied by $s_l = s_{l-1}$.

Theorem: If $s_l$ is less than or equal to $k^*_{l-1}$ $$B_l = \left[ B_{l-1} + 1 - \frac{w_l}{D_l}(t_l - t_{l-1}) \right]^+$$

$$k_l^* = \begin{cases} l & \text{if } B_l = 0 \\ k_{l-1}^* & \text{otherwise} \end{cases}$$

The theorem motivates Algorithm 1 below to computer burstiness $B_l$ at each time tl right before packet 1 is sent. If the above condition holds and both quantities known at time tl, it follows a path to compute $B_l$ and $k_l^*$ from $B_{l-1}$ and $k^*_{l-1}$ in one step. Otherwise it follows a different path to computer $B_l$ and $k_l^*$ recursively using (15) and (16), starting from the initial conditions $B(s_l, s_l) = 0$, $k^*(s_l, s_l) = s_l$.

Algorithm 1
1. initialize $B_0 = 0$; $k_l^* = 0$.
2. for each packet l=1, 2, . . .
   2.1 if $s_l \le k_{l-1}$ (fast path)

$$B_l = \left[ B_{l-1} + 1 - \frac{w_l}{D_l}(t_l - t_{l-1}) \right]^+$$

$$k_l^* = \begin{cases} l & \text{if } B_l = 0 \\ k_{l-1}^* & \text{otherwise} \end{cases}$$

2.2 else (slow path)
     2.2.1 initialize $B(s_l, s_l) = 0$; $k^*(s_l, s_l) = s_l$.
     2.2.2 for k=$s_l$+1 to l $$B(s_l, k) = \left[ B(s_l, k-1) + 1 - \frac{w_k}{D_k}(t_k - t_{k-1}) \right]^+$$

$$k^*(s_l, k) = \begin{cases} l & \text{if } B(s_l, k) = 0 \\ k^*(s_l, k-1) & \text{otherwise} \end{cases}$$

endfor
   2.2.3 $B_l = B(s_l, l)$; $k_l^* = k^*(s_l, l)$.
   endif
endfor

The fast path has a computational cost of O(1) for each packet sent. The slow path has a computational cost O(window size) for each packet sent. When traffic is smooth, $B_l$ is typically small. Then $k_l^*$ is close to l and greater than $s_{l+1}$. In this case the fast path dominates.

Approximate Computation

We now describe an algorithm to compute $B_l$ approximately that runs in constant time per packet independent of window size. As shown above, $B_l = B(s_l, l)$ and $B(s_l, l)$ can be computed recursively from (15).

$$B(s_l, l) = \left[ B(s_l, l-1) + 1 - \frac{w_l}{D_l}(t_l - t_{l-1}) \right]^+ \quad (17)$$

Since $s_l$ is generally different for each l, $B(s_l, l)$ needs to be computed anew from the initial condition $B(s_l, s_l) = 0$ for every l (unless $s_l$ is less than or equal to $k^*_{l-1}$). The idea of the algorithm is to approximate $s_l$ by some other u(l) on both sides of (17), and then use recursion to compute B(u(l), l) from B(u(l), l−1) in one step. $B_l$ is then approximated by B(u(l),l). We now show how to choose u(l) for each l and the information to maintain to yield constant running cost per packet.

Assume the sender produces packets with sequence numbers 1, 2 . . . . We choose "initialization packets $\tau_j$, j=1, 2, . . . defined as follows:

$$\tau_1 = 1$$

$$\tau_j = \tau_{j+1} + \left\lfloor \frac{w \tau_{j-1}}{F} \right\rfloor$$

where F is an integer with the interpretation that roughly F initialization packets are chosen in each RTT, approximately equally spaced. Typically, F=2 or 4, for example. Note that we know the next initialization packet $\tau_{j+1}$ at time $\tau_j$ (i.e. time $t_{\tau j}$)

At time $\tau_j$, we initialize the sequence (B($\tau_j$, l), l greater than or equal to $\tau_j$) by setting B($\tau_j,\tau_j$)=0. At successive times l,l greater than or equal to $\tau_j$, we computer B($\tau_j$, l) from B($\tau_j$, l−1) by carrying out one step of the recursion (15). We maintain this sequence until time l such that $s_l$ is greater than $\tau_j$. In other words, at each time l, we maintain roughly F sequences (B($\tau_j$, k), k=$\tau_j,\tau_j+1,\ldots$, l) for all $\tau_j$'s that satisfy s, less than or equal to $\tau_j$ less than or equal to 1. Each sequence (B($\tau_j$, k), k=$\tau_j$, $\tau_j+1,\ldots$,l) is 1−$\tau_j$+1 in length, which is at most the size of the current window l−$s_l$+1. Sequences with initialization packets $\tau_j$ less than $s_l$ can be dropped because at future times k is greater than or equal to l, $s_k$ is greater than $\tau_j$.

To calculate $B_l$ at time l, we compute:

$$B(\tau_j, l) = \left[ B(\tau_j, l-1) + 1 - \frac{w_l}{D_l}(t_l - t_{l-1}) \right]^+ \quad (18)$$

for all $\tau_j$'s that satisfy $s_l$ less than or equal to $\tau_j$ less than or equal to l, i.e. j ranges through all the (roughly) F initialization packets within the time interval between $s_l$ and l. Let u(l)=min{$\tau_j | s_l$ less than or equal to $\tau_j$}. Then we approximate $B_l$=B($s_l$,l) by:

$$\hat{B}_l = B(u(l), l)$$

Hence the computation cost per packet is to roughly update F sequences using (18) and a single assignment.

Algorithm 2 implements the scheme (note variable counter is a counter to determine the next initialization packet.

1. initialize u=1, v=1, $k_l$=1, B($k_l,k_l$)=0; counter=$w_l$/F.
2. for each packet l=2, 3, . . .

2.1 while ($s_l > k_u$) do u:=u+1.
2.2 for i=u, u+1, . . . , v $$B(k_i, l) = \left[ B(k_i, l-1) + 1 - \frac{w_l}{D_l}(t_l - t_{l-1}) \right]^+$$

endfor
2.3 $\hat{B}_l$:=B($k_u$,l)
2.4 counter:=counter−1.
2.5 if counter <0
  v:=v+1; $k_v$=l; B($k_v,k_v$)=0; counter=$w_l$/F
  endif
endfor The idea of burstiness reduction is to regulate the transmission rate to limit $B_l(t)$ to be less than a threshold. When an acknowledgment arrives (step 1001), $B_l(t)$ is calculated (step 1002) before transmitting any new packets. At decision block 1003 it is determined if $B_l(t)$ is less than a threshold value. New packets are sent only if $B_l(t)$ is less than the threshold (step 1004), and postponed otherwise (step 1005).

Figure 12:
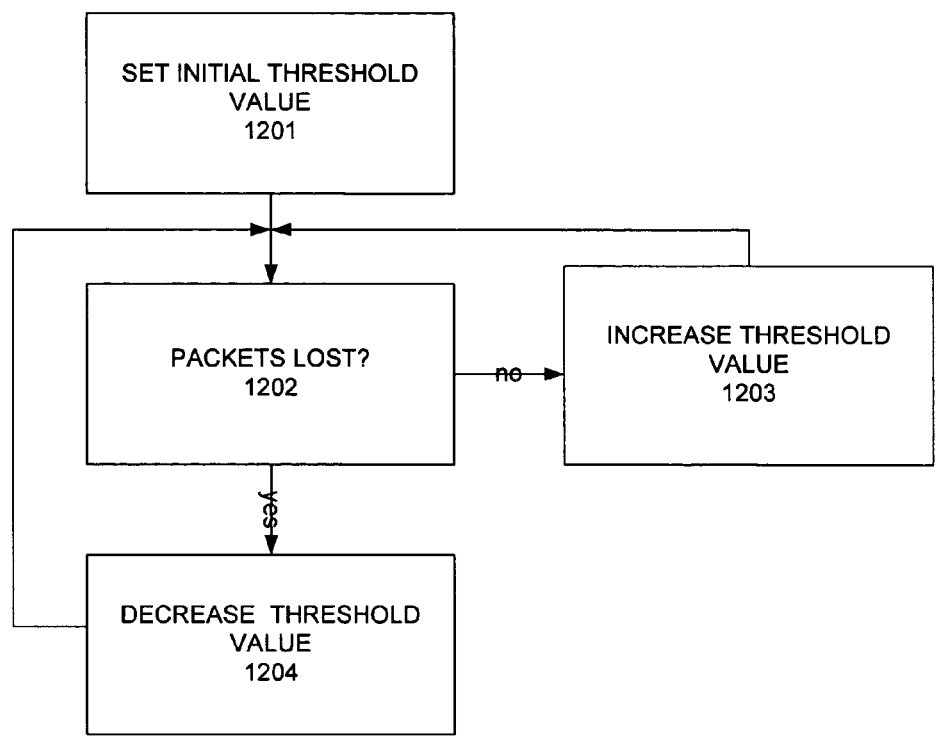
FIG. 12 is a flow diagram illustrating an embodiment to determine a threshold value to reduce burstiness.

The threshold value for burstiness reduction is adaptively determined in one embodiment of the invention such as shown in FIG. 12. An amount of buffering space thought to be appropriate for the current connection is set at an initial value at step 1201. This initial value may be arrived at by knowing the speed of the RTT. The threshold value should be an estimated buffering capacity in the bottleneck link in the path of a flow. If the threshold is too small, the connection can be underutilized. If the threshold is too large, it can be overutilized and packets can be lost. It can be adaptively determined in one embodiment of the invention such as shown in FIG. 12. One method of adaptively determining the threshold is to reduce the threshold value (step 1204) when packets are lost (step 1202 is true) and then to increase the threshold value (step 1203) following a predetermined incrementation scheme until packet loss has disappeared (step 1202 false). This value can be time varying and updated dynamically during a session or it could be fixed for a session.

Window Pacing

Figure 11:
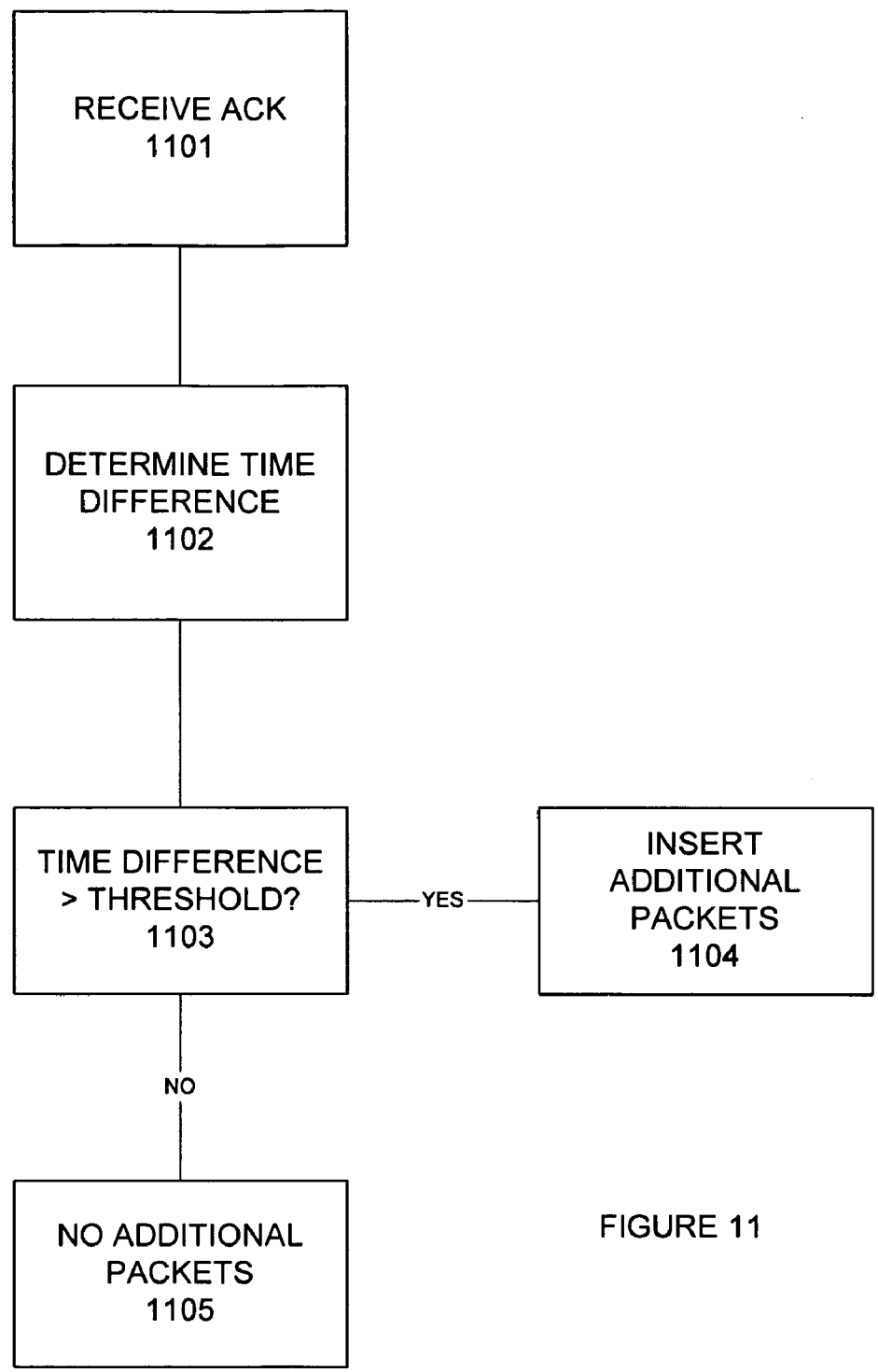
FIG. 11 is a flow diagram illustrating an embodiment of window pacing in the present invention.

A Window pacing function attempts to increase the congestion window smoothly over the idle time of a connection to break up large bursts of packets. This is done in the hope that self-clocking supplemented with the burstiness reduction mechanism 303 would then maintain the "smoothness" of data transmission. For example, during the slow-start phase, packets tend to be sent out in bursts. Pacing the increase to the congestion window can break up such bursts. There are two components in window pacing, one to detect idle times and the other to spread window increments over these idle times. The operation of the window pacing block 804 is illustrated in FIG. 11. An acknowledgement is received at step 1101. Idle time detection is accomplished by checking the difference in time between the most recent packet transmission and the current time when an acknowledgment is received at step 1102. If this time difference is larger than a threshold at step 1103, the idle time is considered long enough to insert additional packet transmissions at step 1104. However, this idle time would have passed by the time the detection is made. Fortunately, due to self-clocking, this idle time should reappear in the next RTT assuming no significant changes in network condition. Thus, the increment to the congestion window in the next RTT will be spread over this idle time when it reappears. If the time difference is less than a threshold, no additional packets are inserted (step 1105).

The threshold can be determined by the use of a timer, and the threshold is limited by the resolution of the timer. In one embodiment, the threshold is set at a coarse level of twice the resolution of the timer. Fine tuning up to the resolution of the timer can then be used to improve performance.

Figure 4:
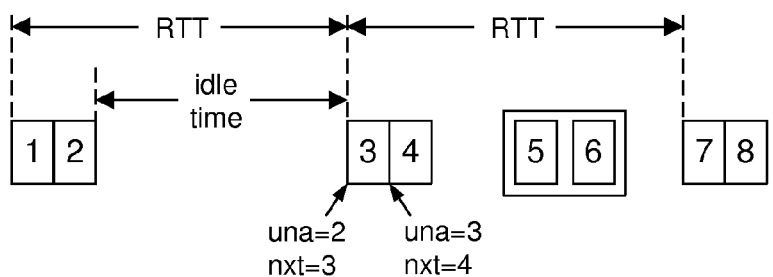
FIG. 4 illustrates window pacing in an embodiment of the present invention.

FIG. 4 illustrates an example of how window pacing works in slow start. Initially, packet 1 and 2 are sent. When the acknowledgment for packet 1 is received one RTT later, the sender detects a large enough idle time based on the transmission time of packet 2 and the arrival time of the acknowledgment for packet 1. The first unacknowledged packet, una, becomes 2, and the next packet to sent, nxt, is 3. The key to using this idle time for pacing is that the una value, when this idle time reappears one RTT later, would equal to the nxt value when this idle time is first detected. Thus, when una becomes 3, the sender would recognize this as the beginning of the idle time. Since TCP is in slow start, the congestion window will be incremented by two in this RTT. This increment can then be scheduled as two separate additions of one each to the congestion window during the coming idle time.

One embodiment of the invention in Linux provides an implementation of pacing that uses the tasklet construct to delay window increment by a random wait interval uniformly distributed between 2 ms and 5 ms. In another embodiment an independent scheduler, based on tasklet, is provided to perform window pacing for multiple connections on the same machine. However, the present invention can be implemented in any operating system and is not limited to Linux.

Packet Level Implementation

Since TCP is an event-based protocol, control actions in one embodiment are triggered by the occurrence of various events. Therefore, flow-level algorithms are converted into event-based packet-level algorithms. There are a number of types of events that the present invention reacts to, including: on the reception of an acknowledgment, after the transmission of a packet, at the end of an RTT, and for each packet loss.

For each acknowledgment received, the estimation component computes the average queuing delay, and the burstiness control component determines whether packets can be injected into the network. For each packet transmitted, the estimation component records a time-stamp, and the burstiness control component updates corresponding data structures for bookkeeping. At a constant time interval, which may be checked on the arrival of each acknowledgment, window control calculates a new window size. At the end of each RTT, burstiness reduction calculates the target throughput using the window and RTT measurements in the last RTT. Window pacing will then schedule to break up a large increment in congestion window into smaller increments over time. During loss recovery, the congestion window will be continually updated as if under normal network condition, based on congestion signals from the network. Each time a new packet loss is detected, a sender determines whether to retransmit it right away or hold off until a more appropriate time.

Figure 5:
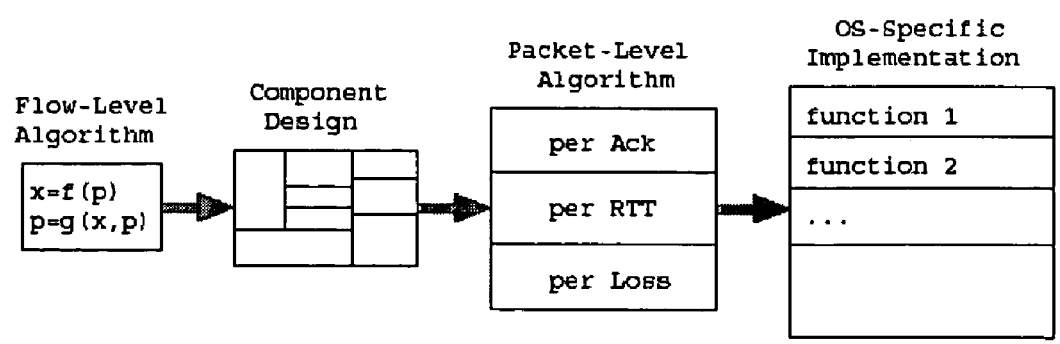
FIG. 5 illustrates how to move from flow level design to an embodiment of the present invention.

FIG. 5 presents an approach to turn the high-level design of a congestion control algorithm into an implementation. First, an algorithm is designed at the flow-level and analyzed to ensure that it meets the high-level objectives such as fairness and stability. Based on that, one can determine the components necessary to implement congestion control. The flow-level algorithm can then be translated into a packet-level algorithm that consists of a set of event-based tasks. The event-based tasks should be independent of any specific TCP or operating system implementation, but yet detailed enough so the understanding of these tasks enables one to implement the invention in any operating system or protocol stack.

The present invention provides a framework for distributed congestion control based on feedbacks (either explicit or implicit) from the network. One embodiment uses queuing delay to provide the feedback of network congestion implicitly. However, if explicit feedback based on congestion level in the network were to become available, the invention can take advantage of this by using this explicit signal exclusively, or in combination with queuing delay, depending on the specifics of this feedback.

Thus, a method and apparatus for network congestion control is described in conjunction with one or more specific embodiments. The embodiments of the present invention are defined by the following claims and their full scope of equivalents.

We claim:

1. A method of controlling size of a congestion window in a communication between a transmitting device and a recipient device, the communication using a transmission control protocol, comprising:
    at the transmitting device:
        in response to receiving an acknowledgment from the recipient device, determining a queuing delay and an average round trip time of a transmission of a plurality of data packets, wherein the queuing delay is the difference of the average round trip time of the data packets between the transmitting device and the recipient device and a base round trip time of the data packets, the base round trip time being a minimum round trip time observed in the communication between the transmitting device and the recipient device; and
        resetting the size of the congestion window in accordance with a function of a current size of the congestion window and the queuing delay, wherein the function generates a value dependent on the queuing delay.

2. A method according to claim 1, further comprising:
    detecting a loss of data packets in the communication between the transmitting device and a recipient device; and
    upon detection of a loss of data packets, decreasing the size of the congestion window by resetting the size of the congestion window to a predetermined fraction of the current size of the congestion window.

3. A method according to claim 1, wherein the resetting of the size of the congestion window is performed only during every other round trip time in the communication between the transmitting device and a recipient device.

4. An apparatus for controlling size of a congestion window in a communication between a transmitting device and a recipient device, the communication using a transmission control protocol, the apparatus comprising:
    one or more processors; and
    memory for storing instructions to be executed by the one or more processors, the instructions to:
        in response to receiving an acknowledgment from the recipient device, determine a queuing delay and an average round trip time of a transmission of a plurality of data packets between the transmitting device and the recipient device, wherein the queuing delay is the difference of the average round trip time of the data packets and a base round trip time of the data packets, the base round trip time being a minimum round trip time observed in the communication between the transmitting device and the recipient device; and
        reset the size of the congestion window in accordance with a function of a current size of the congestion window and the queuing delay, wherein the function generates a value dependent on the queuing delay.

5. An apparatus according to claim 4, further comprising instructions to:
   detect a loss of data packets in the communication between the transmitting device and a recipient device; and
   upon detection of the loss of data packets, decrease the size of the congestion window-by resetting the size of the congestion window to a predetermined fraction of the current size of the congestion window.

6. An apparatus according to claim 4, wherein the instructions to reset the size of the congestion window are executed only during every other round-trip time in the communication between the transmitting device and a recipient device.

7. A system that controls the transmission of messages from a sender device to a recipient device over a network, comprising:
   an estimation block that, in response to receiving an acknowledgment from the recipient device, generates a signal that represents a queuing delay of the messages, wherein the queuing delay is the difference of an average round trip time of the messages between the sender device and the recipient device and a base round trip time of the messages, the base round trip time being a minimum round trip time observed in a communication between the sender device and the recipient device; and
   a window control block adapted to control size of a congestion window by resetting the size of the congestion window in accordance with a function of a current size of the congestion window and the queuing delay, wherein the function generates a value dependent on the queuing delay.

8. A system according to claim 7, wherein
   the window control block resets the size of the congestion window only during every other round trip time in the communication between the sender device and the recipient device.

9. A system according to claim 7, wherein the system is embodied as one of a proxy server or an internet router.

* * * * *